Oct. 18, 1932.    L. M. POTTS    1,882,893
SOUND PICTURE CAMERA
Filed Feb. 5, 1930    4 Sheets-Sheet 1
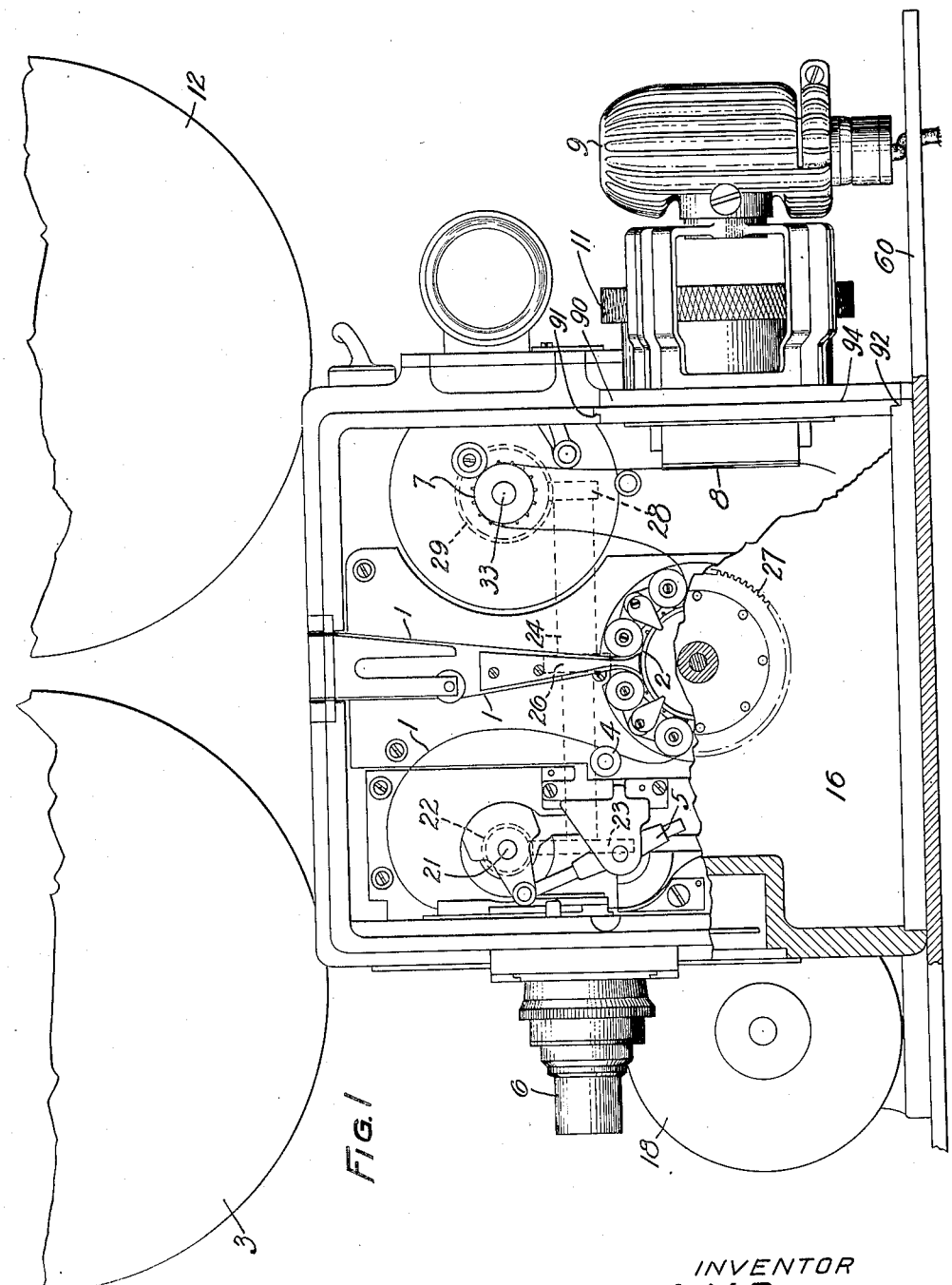
INVENTOR
L. M. POTTS
BY
G. H. Heydt
ATTORNEY

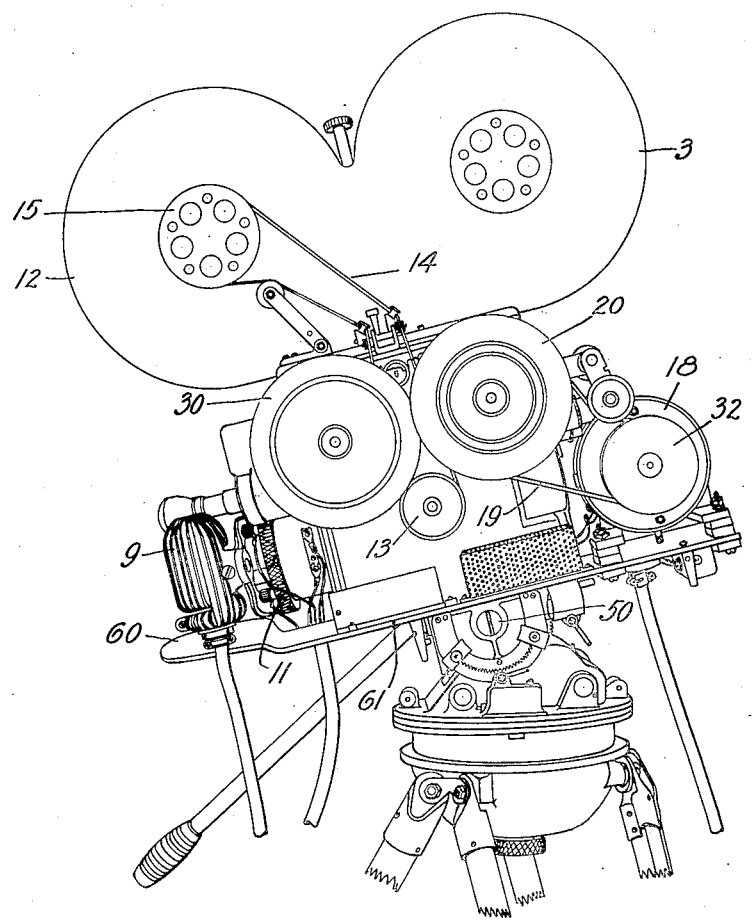

Oct. 18, 1932.  L. M. POTTS  1,882,893
SOUND PICTURE CAMERA
Filed Feb. 5, 1930  4 Sheets-Sheet 3
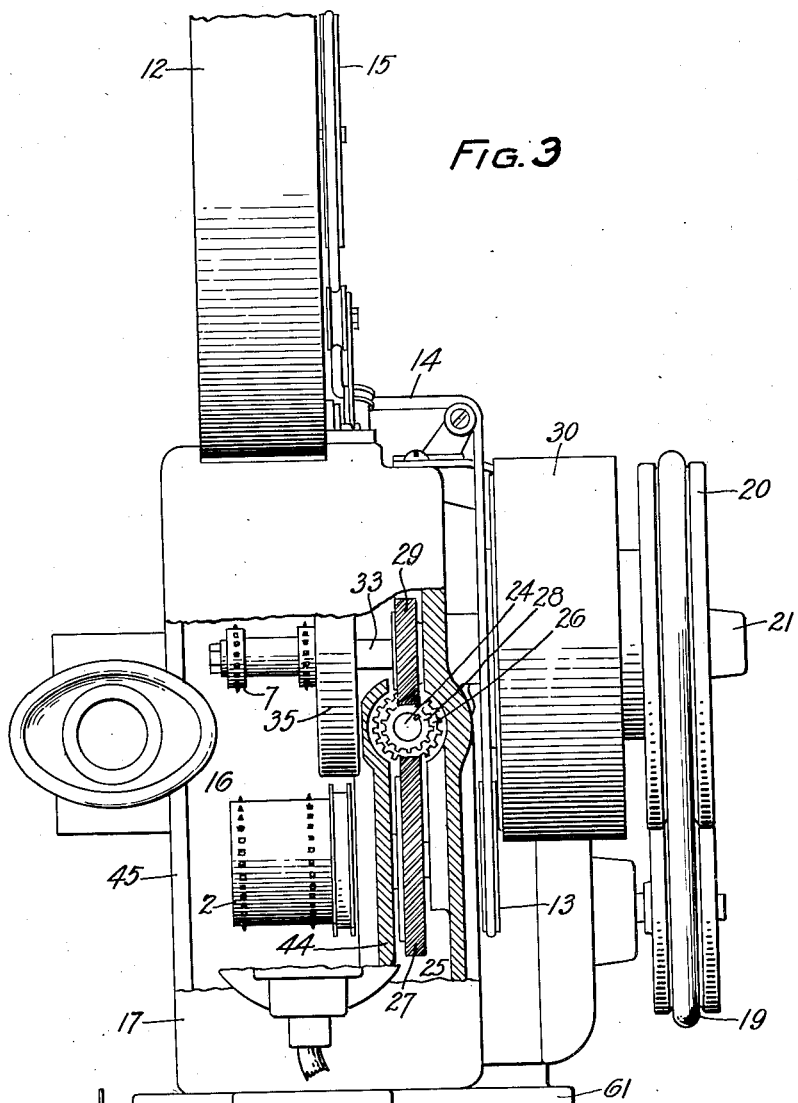
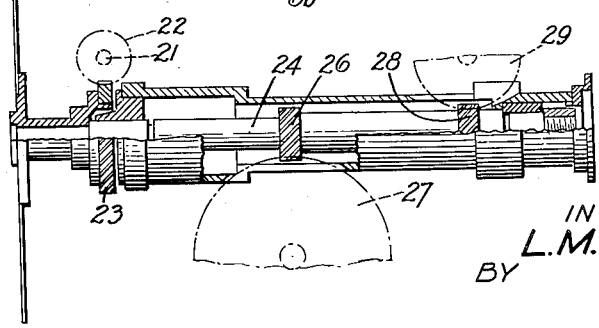
INVENTOR
L. M. POTTS
BY
G. H. Heydt
ATTORNEY Oct. 18, 1932.  L. M. POTTS  1,882,893
SOUND PICTURE CAMERA
Filed Feb. 5, 1930   4 Sheets-Sheet 4
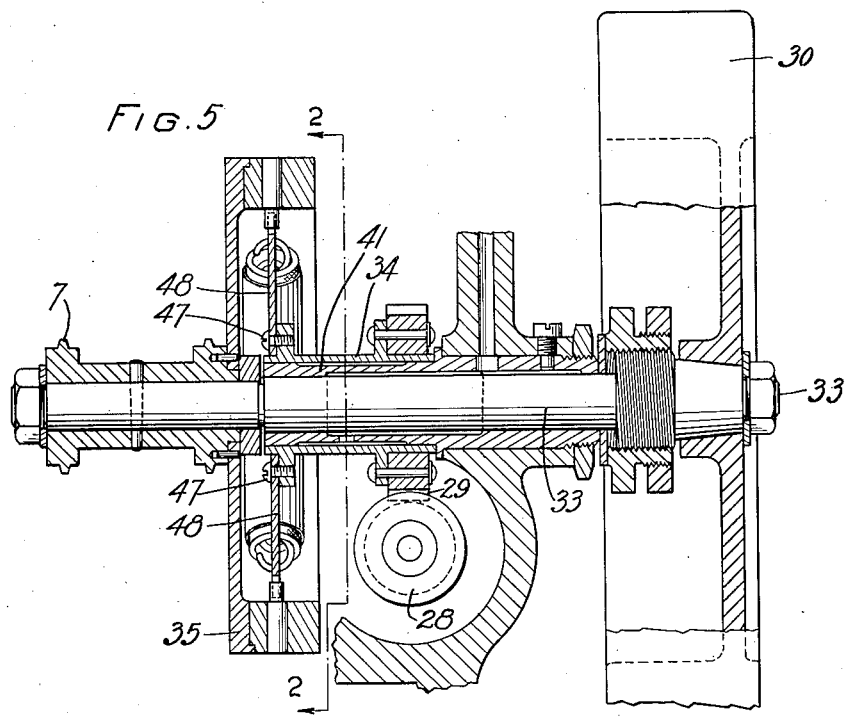
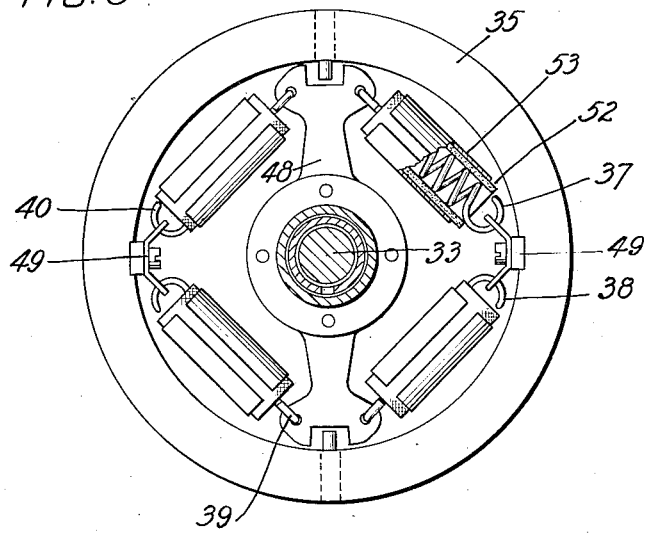
INVENTOR
L. M. POTTS
BY
G. H. Heydt
ATTORNEY Patented Oct. 18, 1932

1,882,893

UNITED STATES PATENT OFFICE

LOUIS M. POTTS, OF EVANSTON, ILLINOIS, ASSIGNOR TO BELL TELEPHONE LABORATORIES, INCORPORATED, OF NEW YORK, N. Y., A CORPORATION OF NEW YORK

SOUND PICTURE CAMERA

Application filed February 5, 1930. Serial No. 425,932.

This invention relates to a sound picture camera adapted to record on a film a series of pictures as well as a sound track representing and recording the audible effects which accompany the picture. The sound picture camera of the invention is designed particularly for newsreel work where portability is desired and where flexibility and ease of manipulation are essential.

It has heretofore been proposed to provide both a picture recording mechanism and a sound recording mechanism in the same camera. One of the principal problems which has presented itself in providing cameras of this sort has been to provide for feeding the film with an intermittent motion behind the lens for a pictorial representation and moving the film with a continuous steady motion into cooperation with the light modulator for making the sound record. It is essential that even slight variations in the speed of the feed sprocket for the film where it cooperates with the sound modulator be eliminated since such slight variations will manifest themselves as a "flutter" in the sound reproduced from the record. Various arrangements have been provided for obtaining continuous speed particularly in projecting machines involving the use of flywheels and mechanical filters. The problem is somewhat simplified in the case of projectors, however, because owing to the size of the apparatus it is feasible to drive the sound sprocket and intermittent mechanism through independent transmissions from the driving motor. However, in order to conserve space and to simplify the entire mechanism in a camera of the portable type it is necessary to resort to a different type of drive which introduces new problems in obtaining constant speed at the sound recording point.

In accordance with the invention, the intermittent mechanism is driven directly from the motor and the sound sprocket is geared to the intermittent mechanism. In an arrangement of this sort it is obvious that irregularities introduced by the intermittent mechanism and inherent in such mechanisms must be compensated for in order to prevent their transmission to the sound sprocket. This is accomplished by providing a flywheel of substantial mass on the drive shaft for the intermittent motion and for providing a second flywheel geared with the intermittent drive shaft and providing a mechanical filter between the two flywheels to damp or filter out variations due both to the intermittent motion and to irregularities. The geared drive is essential in order to maintain synchronism between the picture and sound record which precludes the use of belt or other friction drives where irregularities due to gearing do not enter into the problem.

In cameras which are readily portable and which are designed particularly for news work, it is necessary to provide a mounting which will give the camera man great scope in following the subject he desires to photograph. It is necessary that the camera be movable in practically any direction except that it should be maintained perpendicular to the horizontal line in the foreground of the scene. Universal bases for cameras have been heretofore provided but for most efficient use of such bases it is desirable that the entire camera be balanced about its pivotal point. In a sound picture camera which is motor driven and which involves a number of heavy rotating masses, not only should the camera be statically balanced but also dynamically balanced. In accordance with the invention this balance is obtained by using the light modulator which is of considerable mass to counterbalance the driving motor and in locating the flywheels and other rotating masses with their axes at right angles to the perpendicular axis of the camera as a whole, or, in other words, in line with the horizontal pivot.

Another feature of the invention consists in making the light modulator readily detachable so that it may be removed for adjustment and another substituted in its place with a minimum amount of manipulation. It is obvious that the invention is not limited to any particular form of intermittent motion or to any particular form of light modulator, alternative forms of such mechanisms being well known.

In the illustrated embodiment Figs. 1 and 2 show opposite side elevations of a camera incorporating this invention. Fig. 3 shows an end elevation of the same camera, Figs. 4, 5 and 6 show detailed structure of the driving mechanisms for the camera devices.

A dynamically and statically balanced camera for recording pictures and accompanying sound is attained by the use of flywheels 20 and 30 of suitable mass according to location and work to be accomplished in addition to the consideration given to the allocation of other mechanisms equilateral of the camera pivot 50. Various views of the driving mechanisms for the camera devices are shown in Figs. 1, 2, 3, 4 and 5. The location, mass and mechanical relation of the flywheels is best understood by reference to Figs. 2, 3 and 5. Flywheel 20 is connected by shaft 21 to an intermittent motion or metering device 5 of conventional design. This flywheel 20 is belt-driven through pulley 32 operated by motor 18, the flywheel having a groove therein to accommodate belt 19. A gear 22, best shown in Figs. 1 and 4, is keyed to shaft 21 between the flywheel 20 and the intermittent motion 5 for driving a horizontal shaft 24 through gear 23. The shaft 24 has gears 26 and 28 keyed thereto for driving the hold-back sprocket 2 through gear 27 and the flywheel 30 and sprocket 7 through gear 28 respectively. A mechanical filter is inserted to overcome torque irregularities, in the train of gear driven mechanisms between gear 29 and sound sprocket 7 and the flywheel 30 which are on the same shaft.

The construction of the resilient mechanical filter is best shown in Figs. 5 and 6 in which gear 29 is shown mounted on sleeve 34. Sleeve 34 is arranged to rotate freely on housing 41 and is fastened by screws 47 to yoke 48. This yoke is flexibly connected to filter wheel 35 by the damped springs 37, 38, 39 and 40. Felt rings 52 and retainers 53 are provided to dampen natural period oscillations and vibrations. Coupling members 49 are used for connecting the gear driven sleeve yoke and springs to the filter flywheel 35. The filter wheel 35, sprocket 7 and flywheel 30 are rigidly connected to shaft 33 and rotate at a constant speed for carrying the film past the light modulator for making sound records. This mechanical filter as a link in the driving mechanism for the sound sprocket, coupled with the swamping effect of the flywheel 30 does not permit the effect of irregularities introduced by the intermittent motion mechanism or other irregularities to be reflected to the sound sprocket which must be rotated at a constant speed synchronous with the overall speed of the picture film.

The progress of the film through the camera is best shown in Fig. 1 in which the film 1 engages the upper, left-hand quadrant of the hold-back sprocket 2 and is withdrawn by the sprocket 2 from the feed reel (not shown) in container 3 and driven past the guide roller 4. The intermittent movement 5 draws the film downward and intermittently exposes the film to the light passing through the lens system 6 thus making a photographic record of the moving scene. The exposed film then engages the lower part of the sprocket 2 (not shown), a loop being formed in the film between the intermittent movement 5 and the sprocket 2. The constant speed sprocket 7 draws the film past the sound gate 8 where the unexposed sound track is exposed to the light from a lamp in container 9 which is modulated by light valve 11. The light valve method of recording has been illustrated for convenience of description, but it will be understood that any other convenient method for securing a photographic record of sound may be used. After leaving the sprocket 7 the film engages the upper, right-hand quadrant of the sprocket 2 and is forced upward. The take-up reel (not shown) in the container 12 is driven by a pulley 13 which is keyed to the shaft on which the hold-back sprocket is mounted. Pulley 13 and the remaining driving mechanism for the take-up reel including the pulley cord 14 and take-up reel driving pulley 15 are best shown in Figs. 2 and 3. The pulley 15 is mounted on the shaft of the take-up reel.

The operating mechanism described above is contained in a light tight compartment 16 formed by the body 17 and the door 45 of the camera. The rear lower wall 44 dividing compartments 16 and 25 has been shown as partly broken away in Fig. 1 to expose a part of the gear compartment 25, shown more in detail in Fig. 3. The latter figure illustrates comparative locations of the driving gears, sprockets, intermittent motion and sound sprocket flywheels and the mechanical filter flywheel. The general construction of shaft 24 and the gears mounted thereon and the method of mounting the shaft is shown in Fig. 4 in order that a clear understanding of the train of driving gears may be had.

Shoulder rest 60 is provided as an extension of base 61 for convenience in transporting the camera. It will be noted that the rest is mounted directly under the light container 9 and modulator 11 and serves to protect these camera parts in addition to its primary function.

The spacing between the elements of the modulator such as the lamp, condensing lens, light valve, objective lens and film, must be accurate and this accuracy of spacing maintained. For this reason the modulator is made as a unit assembly and is readily removable either for adjustment or for the substitution of another modulator unit in its place with a minimum amount of manipulation. By referring to Fig. 1 it will be noted that the modulator unit including the sound gate is attached to a metal panel 90 which is arranged to slide in place in grooves 91 and 92. These grooves are accurately machined for holding the modulator in an exact position. The utility of such an arrangement is readily appreciated since it is necessary to maintain the focus of the image of the light beam through the light valve within very close limits. In addition to the foregoing adjustments, the sound gate must be properly located with respect to the sound sprocket in order to remove the possibility of the film rubbing against the sides of the sprocket teeth which interferes with proper recording. The door 45 fits into groove 94 for preventing lateral movement of the modulator unit.

What is claimed is:

1. In a sound picture camera, a casing, a pivotal mounting for said casing, means within said casing for intermittently feeding a film adjacent a picture lens and a sprocket for continuously feeding said film adjacent a sound controlled light modulator, and means external to said casing for driving said film feeding means comprising a motor, a flywheel driven therefrom, and a second flywheel driven by said first flywheel, said motor being substantially balanced by the light modulator and said flywheels being on opposite sides of said pivotal mounting and of such mass as to afford a balance of the camera equilateral of the pivotal point.

2. In a sound picture camera, a casing, a pivotal mounting for said casing, means within said casing for intermittently feeding a film adjacent a picture lens and a sprocket for continuously feeding said film adjacent a sound controlled light modulator, and means external to said casing for driving said film feeding means comprising a motor, a flywheel driven therefrom and a second flywheel driven by said first flywheel through a train of gears and a mechanical filter, said motor being substantially balanced by the light modulator and said flywheels being on opposite sides of said pivotal mounting and of such mass as to afford a balance of the camera equilateral of the pivotal point.

In witness whereof I hereunto subscribe my name this 31st day of January, 1930.

LOUIS M. POTTS.